March 25, 1941.  E. F. JACKMAN  2,236,370
RADIALLY YIELDABLE DEVICE
Filed April 1, 1939
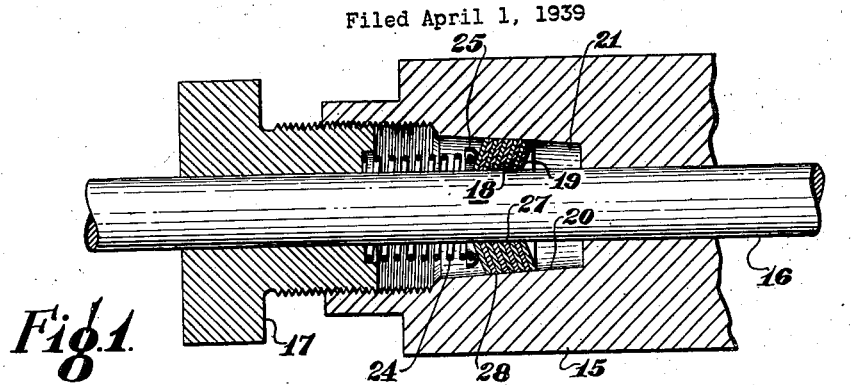
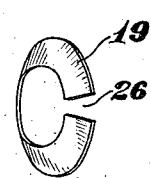
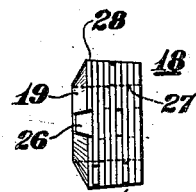
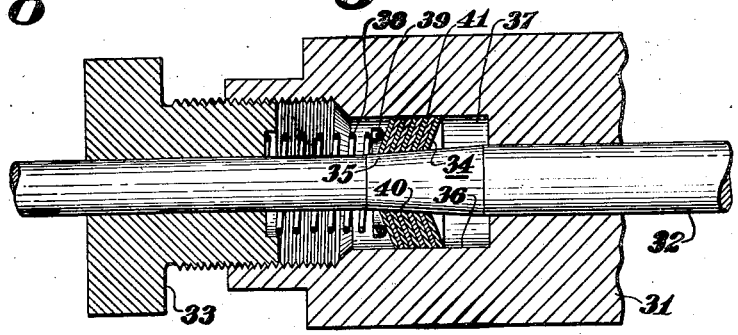
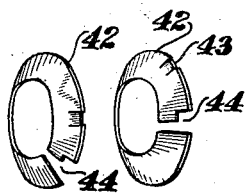
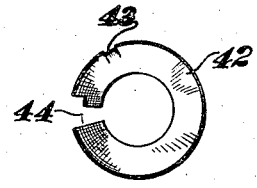
INVENTOR.
Elmer F. Jackman.
BY Hoodling and Kroat.
ATTORNEY.

Patented Mar. 25, 1941

2,236,370

UNITED STATES PATENT OFFICE 2,236,370

RADIALLY YIELDABLE DEVICE

Elmer F. Jackman, Lakewood, Ohio, assignor to George V. Woodling and Elmer F. Jackman, co-trustees as joint assignee Application April 1, 1939, Serial No. 265,479

6 Claims. (Cl. 286—30)

My invention relates in general to radially yieldable devices adapted to be positioned between and bear against two relatively movable members, and more particularly to packings, bearings, bushings or the like.

An object of my invention is to provide for sealing the space between two relatively movable members.

Another object of my invention is the provision of a radially yieldable device, adapted to be positioned between and bear against two relatively movable members, which compensates for wear.

Another object of my invention is the provision of a radially yieldable device, adapted to be positioned between and bear against two relatively movable members, which automatically compensates for wear.

Another object of my invention is the provision of making a radially yieldable device out of material which is substantially non-compressible.

Another object of my invention is the provision of a radially yieldable device arranged to have circumferential relative movement with respect to either of the two relatively movable members between which it is mounted.

Another object of my invention is to permit the radially yieldable device to rotate in the housing in which it is mounted and thereby prevent the radially yieldable device from wearing in a localized area.

Another object of my invention is to provide for making a packing, bearing, bushing, or the like yieldable in a radial direction but substantially non-compressible in a longitudinal direction.

Another object of my invention is to provide for making a radially yieldable device of a plurality of assembled parts having inner and outer non-parallel circumferential surfaces and for mounting the assembled parts between two relatively movable members having annular non-parallel longitudinal surfaces defining an annular converging space which substantially conforms to the assembled parts.

Another object of my invention is to provide for resiliently exerting a longitudinal pressure upon the assembled parts of the radially yieldable device to cause each of the parts to exert substantially the same radial pressure upon the annular converging surfaces of the relatively movable members between which the radially yieldable device is mounted.

Another object of my invention is to cause the longitudinal movements of the radially yieldable device in the annular converging space defined by the relative movable members to be limited by the engagement of the radially yieldable device against the annular non-parallel longitudinal surfaces of the said relative movable members.

Another object of my invention is to provide for mounting the radially yieldable device at a distance from the converging end of the annular converging space defined by the relative movable members between which the radially yieldable device is mounted.

Another object of my invention is the provision of a packing, bearing, bushing, or the like which automatically maintains a close engagement with the relatively movable members between which same is mounted.

Another object of my invention is the provision of a packing, bearing, bushing, or the like which has good wearing qualities.

Another object of my invention is the provision of a radially yieldably device which will maintain a close fitting engagement and a fluid tight seal between a shaft and a housing movable relative to each other regardless of whether the shaft and housing are concentric or excentric, or in alignment or out of alignment, or running true or wabbling relative to each other.

Another object of my invention is the provision of making a packing, bearing, bushing, or the like of a plurality of truncated, conically-shaped split washers.

Another object of my invention is the provision of making a packing, bearing, bushing, or the like of a plurality of truncated, conically-shaped split washers circumferentially locked together.

Another object of my invention is the provision of maintaining a close fitting engagement between a shaft and a housing movable relative to each other and both defining a tapering annular space by an assembly of split flexible washers of truncated conical form nested closely together and forming a gradually tapering unit to closely fit the tapering annular space, regardless of whether the shaft and housing are concentric or excentric, or in alignment or out of alignment, or running true or wabbling relative to each other.

Another object of my invention is the provision of mounting a plurality of truncated, conically-shaped split washers of gradually reducing size into an annular tapering space defined by a shaft and an encircling housing and of permitting each washer to have freedom of movement as to changeable transverse or conical angularities.

Another object of my invention is the provision of a radially yieldable device which distributes the total pressure at which it engages the relatively movable members substantially uniformly throughout the entire area of surface contact.

Another object of my invention is the provision of making a radially yieldable device of a plurality of truncated, conically-shaped split washers, each having inner and outer non-parallel circumferential surfaces.

Other objects and a fuller understanding of my invention may be had by referring to the following description and claims, taken in conjunction with the accompanying drawing, in which:

Figure 1 is a cross-sectional view of a device embodying the features of my invention;

Figure 2 is a plan view of a truncated, conically-shaped split washer embodying the features of my invention.

Figure 3 is a perspective view of the split washer shown in Figure 2;

Figure 4 is an assembled view of my radially yieldable device embodying the split washers shown in Figures 2 and 3;

Figure 5 is a cross-sectioned view of a modified form of my invention;

Figure 6 is an exploded perspective view of two split washers having circumferential locking means arranged in the circumferential position, which they will occupy when mounted into an assembled unit; and Figure 7 is a plan view of the right-hand split washer shown in Figure 6, looking from right to left.

With reference to the drawing, my radially yieldable device is illustrated generally by the reference character 18 and comprises a plurality of closely assembled truncated, conically-shaped split washers 19, each having inner and outer non-parallel circumferential surfaces 27 and 28, respectively. The radially yieldable device 18 is adapted to be positioned between and bear against a shaft 16 and a tapered annular wall 20 of a housing 15. The shaft 16, since it has a substantially constant diameter, and the tapered annular wall 20, since it has a gradually varying radial dimension, define an annular converging space or receptacle 21, having non-parallel longitudinal surfaces.

As shown in Figure 4, each of the split washers 19, when assembled, is disposed circumferentially with respect to each adjacent washer, so that the split portions 26 do not communicate with each other.

The inner circumferential surface 27 of each of the split washers 19 is arranged to engage and conform to the shaft 16, and the outer circumferential surface 28 is arranged to engage and conform to the tapered wall 20. Accordingly, the over-all inner and outer circumferential surfaces of the assembled washers of my radially yieldable device 18 fit closely in the annular converging space 21. The close conformity of the inner and outer circumferentially surfaces 27 and 28 to the shaft 16 and to the tapered wall 20 respectively, makes a good seal from one end of the assembled washers to the other, since circumferential communication is blanked between the split portions 26 of adjacent washers of the assembly.

The assembled washers may be resiliently constrained longitudinally into the annular converging space 21 by means of a spring 24 positioned between a suitable recess in an adjustable threaded member 17 and an annular retaining member 25 abutting against the end washer at the larger end of the assembly. The annular retaining member 25 will normally tend to center itself radially about the shaft 16, since the wall of the abutting split washer is tapered. As is manifest, the pressure exerted by the spring 24 upon the assembly of split washers may be varied by adjustably turning the threaded member 17.

The split washers 19 are made of material having good wearing quality. The nature of the material depends upon the particular application of the invention. Under certain applications, the applicant finds that phenolic laminated products or phenol condensation products make a good material. Fibrous and plastic materials also may be used. In other applications certain metals and alloys may be employed. Tests shown that excellent operating results are obtained with materials possessing durable wearing qualities and have the property of being radially yieldable when in the shape of a split washer and substantially non-compressible in a longitudinal direction. The function growing out of the non-compressible material is that the pressure exerted by the spring 24 upon the end washer is readily transmitted to each succeeding washer. The distribution of the longitudinal pressure upon each washer causes the inner and outer circumferential surfaces 27 and 28 of each washer to engage the shaft 16 and the annular tapered wall 20 with substantially the same radial pressure. The individual action of each washer insures full and effective engagement or bearing area throughout the entire length of the radially yieldable device 18. That is to say, the total radial pressure is uniformly distributed throughout the entire area of surface contact. This distribution of pressure prevents localized engagement of bearing areas, with the resultant effect that the engagement or bearing pressure is uniformly low, which increases the life of the material.

The radial dimension of each washer between the shaft 16 and the tapered annular wall 20 gradually varies from each adjacent washer to make the over-all inner and outer circumferential surfaces 27 and 28 to fit closely in the angular converging space 21. By making the washers the correct size and shape, the invention works effectively when first set into operation and does not need a trial period during which it may wear in before final adjustments are made.

Should wear occur from long use, the pressure of the spring 24 resiliently urges the assembled washers to move as a unit longitudinally farther into the annular converging space 21 and causes each of the split washers to radially contract. Upon contraction, the washers maintain a substantially perfect engagement against the encircled shaft 16 and the annular converging wall 20. Each washer is permitted to move freely and independently and thus the assembled unit automatically maintains a good tight sealing engagement between the shaft 16 and the tapered annular wall 20. The contracting of the washers radially slightly change the angle of the cone, but since the wear occurs gradually the inner and outer circumferential surfaces 27 and 28 are maintained in close fitting engagement at all times with the shaft 16 and the tapered annular wall 20.

The end washer at the smaller end of the assembly is positioned at a distance from the end of the tapered annular space 21, so that the washers as a unit are free to move gradually longitudinally into the tapered annular space 21 to accommodate for a considerable amount of wear. The longitudinal movement of the assembled washers is solely limited by the inner and outer circumferential surfaces 27 and 28 respectively engaging the shaft 16 and the tapered annular wall 20.

My radially yieldable device 18 may be employed as a packing, a bearing, a bushing, or the like. In each application, the washers function in substantially the same manner to maintain automatically a close engagement with the two relatively movable members between which they are mounted.

In the illustration in Figure 1, the shaft 16 and the housing 15 may longitudinally reciprocate relative to each other, or they may rotate relative to each other, or they may partake both of a longitudinal and a rotary movement relative to each other. In the case of a relative rotary movement, the assembled washers are free to have circumferential relative movement with either the shaft 16 or the tapered annular wall 20. This freedom of relative circumferential movement of the assembled washers prevents the washers from wearing in a localized area.

In Figure 5, I show a modified arrangement of my invention, in that the shaft 32 has a tapered portion 35 and the annular wall 36 of the housing 31 has a substantially constant radial diameter. The plurality of assembled split washers 34, each have inner and outer circumferential surfaces 40 and 41, respectively, to engage closely the tapered portion 35 of the shaft 32 and the annular wall 36, which define an annular converging space 37. The assembled washers 34 may be resiliently constrained longitudinally into the annular converging space 37 by means of a spring 38 positioned between a suitable recess in an adjustable threaded member 33 and an annular retaining member 39 abutting against the end washer at the larger end of the assembly. The operation of this embodiment of my invention is substantially the same as that described with reference to Figure 1, except that there is limited relative longitudinal movement between the shaft 32 and the housing 31. By reason of the fact that the plurality of split washers are closely nested together, the frictional engagement therebetween tends to prevent them from moving circumferentially with respect to each other.

In Figures 6 and 7, the truncated, conically shaped washers 42 are modified, in that a locking means is provided in addition to the action of the frictional engagement to limit positively the assembled washers from moving circumferentially relative to each other. As illustrated, the locking means may comprise a tab 43 arranged to fit into a cut away portion 44 provided in the next adjacent washer of the assembly. The positioning of the tab 43 into the cut away portion 44 is illustrated by the exploded view in Figure 6, where the washers, when assembled, occupy the circumferential position as shown.

The angularity of the conically shaped washers when assembled in my radially yieldable device 18 and the degree of the convergence of the annular converging space in which the radially yieldable device is mounted, are determined by the nature of the application. The applicant finds that an angularity of the conically shaped washer substantially as shown and a convergence of the annular converging space substantially as shown, produce good operating results, but it is to be understood that the invention is not limited to the angularity and convergence shown in the drawing.

In my invention, it is the close fit of the conical split washers that makes the seal. The seal or close fitting engagement is obtained by preforming the inner and outer circumferential surfaces of the washer to make a close fit with the shaft and the annular wall or surface, without requiring excessive pressures.

The cupped feature of the split washers enables them to maintain a substantially perfect inner and outer circumferential fit upon contraction and expansion. Tests and experiments show that my radially yieldable device maintains a good seal or close engagement between the shaft and the encircling housing, even though the shaft and housing are somewhat excentric, or out of alignment, or wabbling relative to each other. The above results appear to be brought about by reason of the fact that each of the flexible washers is at liberty to move independently with respect to each other to maintain sealing engagement with the shaft and the housing.

The freedom of the assembled washers to act independently enables them to assume a variable transverse angle as well as to assume the variable included conical angle previously described, which changes as the assembly moves longitudinally as a unit into the annular tapering space. The transverse angle may be defined as the angle between the center line of the shaft and a plane coinciding with the base or top of the cone of each washer. Thus the individual washers are able to conform to the shaft and housing, under relatively light pressure, to maintain continuously throughout a long wearing period a good seal or close engagement under any or all of the above described conditions.

A principal feature of my invention is that the truncated, conically shaped split washers need not be crushed or incapacitated by any action exerted by the spring. The function of the spring is twofold: In the first place the spring functions to resiliently constrain the plurality of assembled washers in a close nested position. In the second place, the spring functions to resiliently urge the plurality of assembled washers as a unit longitudinally into the annular converging space defined by the shaft and the annular wall. In order to allow the washers to move longitudinally as a unit, the washer at the end opposite from the spring is spaced at a distance from the end wall of the annular converging space. Each washer may move individually to some extent so that a slight longitudinal pressure of the spring causes the split washers to exert a sufficient radial pressure against the shaft and the annular wall to maintain a substantially constant close fit, which effects a good seal. It is important to keep in mind that it is the close fit of the inner and outer circumferential surfaces of the washers against the shaft and the annular wall that makes the seal effective.

The washers also may move circumferentially relative to the shaft or the annular wall. This freedom prevents the washer from being subject to wear on one side, as would be the case if the plurality of assembled washers were not permitted to move circumferentially relative to the shaft or the annular wall. In addition, the construction is such that the pressure exerted by the spring appears to be substantially uniformly and longitudinally distributed to each of the plurality of washers of the complete assembly, which in turn apparently causes the radial pressure exerted by each washer to be substantially the same. This distribution of pressure gives a substantially uniform engaging contact throughout the entire area of the engagement, and insures a uniformly low unit pressure which gives long wearing life to the material.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A shaft seal device adapted to create a seal between a shaft and a housing movable with respect to each other, one of said members having a conical surface whereby said members together define a tapering annular space surrounding the shaft, said device being disposed within said annular space and comprising a plurality of split flexible washers of truncated conical form nested together with their adjacent conical surfaces coinciding, each of said washers having an inner edge surface engaging said shaft and an outer edge surface engaging said housing, said washers being free to move with respect to each other into sealing engagement with said shaft and housing, and means for urging the nested washers as a unit longitudinally of said shaft toward the smaller end of said tapered space to compensate for wear, the washers being held against such movement solely by the engagement of the edge portions of the individual washers against the shaft and the housing, the over-all length of the nested washers being less than the length of the tapering annular space.

2. A device adapted to be positioned between and bear against two relatively movable members, one of said members having a conical surface and the other said member having a cylindrical surface whereby said members together define a tapering annular space, said device comprising a plurality of closely nested truncated, conically-shaped split washers of gradually decreasing sizes and forming a gradual taper with inner and outer edge surfaces adapted to engage and conform closely to the inner and outer surfaces of the said tapering annular space, said device having means for circumferentially locking the adjacent washers of the assembly together to prevent circumferential relative movement with respect to each other.

3. A device comprising a plurality of truncated, conically-shaped split washers of gradually decreasing sizes and adapted to be closely nested to form a gradual taper with inner and outer edge surfaces, one of said edge surfaces being cylindrical and the other of said edge surfaces being the frustum of a cone.

4. A device comprising a plurality of truncated, conically-shaped split washers of gradually decreasing sizes and adapted to be closely nested to form a gradual taper with inner and outer edge surfaces, said inner edge surface being cylindrical and said outer edge surface being the frustum of a cone.

5. A device comprising a plurality of truncated, conically-shaped split washers of gradually decreasing sizes and adapted to be closely nested to form a gradual taper with inner and outer edge surfaces, said inner edge surface being the frustum of a cone and said outer edge surface being cylindrical.

6. A shaft seal device adapted to create a seal between a shaft and a housing movable with respect to each other, one of said members having a conical surface whereby said members together define a tapering annular space surrounding the shaft, said device comprising a plurality of closely nested truncated, conically-shaped split washers of gradually decreasing sizes and forming a gradual taper with inner and outer edge surfaces adapted to engage and conform closely to the inner and outer surfaces of the said tapering annular space.

ELMER F. JACKMAN.